United States Patent [19]
Averbuch et al.

[11] Patent Number: 5,256,908
[45] Date of Patent: Oct. 26, 1993

[54] FACILITY SPACE DATA LOGGING DEVICE

[75] Inventors: Aaron J. Averbuch, Champaign; Roger L. Brauer, Tolono; Michael G. Edwards, Weldon; William A. Mikucki, Champaign, all of Ill.

[73] Assignee: The United States of America as represented by the Secretary of the Army, Washington, D.C.

[21] Appl. No.: 961,798

[22] Filed: Oct. 16, 1992

[51] Int. Cl.[5] .............................................. G01S 15/00
[52] U.S. Cl. ....................................... 367/99; 367/910; 367/115; 364/564
[58] Field of Search ................... 367/99, 115, 910; 364/564; 356/4, 5; 342/118

[56] References Cited

U.S. PATENT DOCUMENTS 3,588,480  6/1971  Unger et al. .................... 364/564
4,730,190  3/1988  Win et al. ........................ 367/910

Primary Examiner—Daniel T. Pihulic
Attorney, Agent, or Firm—Luther A. Marsh

[57] ABSTRACT

The invention is directed to a portable data logging device for logging data concerning room identification and dimensions in a building or facility. The invention includes a microprocessor based portable computer having manual and automated inputs for logging data including a data port for room dimensions. An electronic distance measuring device produces an output indicative of one or more room dimensions in a digital format. An auxiliary processor responsibly coupled to the output of the distance measuring device converts the output to a coded format recognizable by the microprocessor. The data encoded in the coded format is coupled to the microprocessor via a voltage converter for recordation. The microprocessor may be programmed to step through a series of prompts, responses to which are stored in appropriate data locations for use at a later time.

7 Claims, 3 Drawing Sheets

FACILITY SPACE DATA LOGGING DEVICE

BACKGROUND OF THE INVENTION

This invention relates to an apparatus for logging data. In particular, the invention relates to a portable apparatus for automatically recording room identification, dimensions or other information necessary to accurately monitor space inventory in a facility.

Persons involved in buying, selling, leasing, assigning and using space within buildings need to know the dimensions (length, width, height, area and volume) of rooms and common areas within such facilities. The most common method of obtaining this information is by making measurements manually with a tape. Typically two people are needed to make the measurements which must then be recorded. Usually the information is written down on paper. In many cases the information is thereafter recorded in a computer record. The process is manpower intensive, slow, expensive and prone to error.

A number of technologies can be used to make the task more accurate, efficient and less manpower intensive. For example, hand-held distance measurement devices are available which use ultrasonic or optical transceivers to measure distance. Photographic techniques are also available. A so-called Sonic Tape is relatively easy for one person to use. The device sends out a high frequency, inaudible sound and measures the time required to receive a reflected wave thereby a distance measurement may be calculated. The technology is most often found in automatic cameras. It is relatively inexpensive and it is adequate for most distance measurements inside buildings.

While the use of an ultrasonic distance measuring device may reduce labor requirements, the information must still be recorded. Further, if computer storage is contemplated, the recorded data must thereafter be transferred to a computer file. Recording information into a computer may be facilitated by using currently available hand-held computers. However, the information must still be keyed in manually For example, if a small hand-held computer is programmed to prompt and assist in recording room identifiers such as names, numbers, floors and building numbers and associated dimensions, and if the computer has sufficient memory, an individual could make measurements and log data during the day and then later transfer the information to a computer having a larger memory for permanent storage and use. Such a hand-held computer must have interface capability with such large computer, such as an RS 232 port. The data would be useful in a variety of applications including building management, or in a database associated with a computer aided design program.

Depending on the situation, task and information needed, different data collection protocols could be programmed into the data collection computer. A simple program could compute and display areas in volumes of rooms that would be useful at times. This capability can be accomplished in a calculator if it has more than one memory register. One example of this is a calculator which has three memory registers. Distance readings stored in the memory can be multiplied through normal calculator procedures to compute areas and volumes. Such a calculator is usually not programmable.

Bar code or other scanner technologies might also enhance the data collection task. If, for example, room locations, floors, buildings or work stations are given an identifier in scanner recognizable formats, such as a bar code or some other optically recognizable format such as OCR characters, the logging locations to which dimensions are associated would be greatly simplified. Other facility characteristics such as furniture, equipment and occupant data could also have scanner readable labels which could be read at the same time so that an inventory of each room could be made during the measurement procedure.

While all of the foregoing technologies and devices such as Sonic Tapes, Dimensional Measure Computers, and Bar Code Readers are individually available, they are not available in a single device that allows their combined use in a facility space data logging system. Therefore, a product that would usefully combine the features of the various available devices could reduce the cost of collecting distance measurements and related data in buildings significantly over manual procedures.

SUMMARY OF THE INVENTION

It is therefore an object of the present invention to provide a system for automatically logging data of various kinds associated with a facility which would obviate the shortcomings and limitations of the described prior arrangements. In particular, the invention is directed to a portable data logging device for logging data concerning room identification and dimensions in a building or facility. The invention includes a microprocessor based portable computer for logging the data. The computer has manual and automated inputs for logging data including a data port for room dimensions. An electronic distance measuring device produces an output indicative of one or more room dimensions in a digital format. A processor responsibly coupled to the output of the distance measuring device converts the output to a coded format recognizable by the microprocessor. The data encoded in the coded format is coupled to the microprocessor for recordation. The microprocessor may be programmed to step through a series of prompts, responses to which are stored in appropriate data locations for use at a later time.

DESCRIPTION OF THE INVENTION

Figure 1:
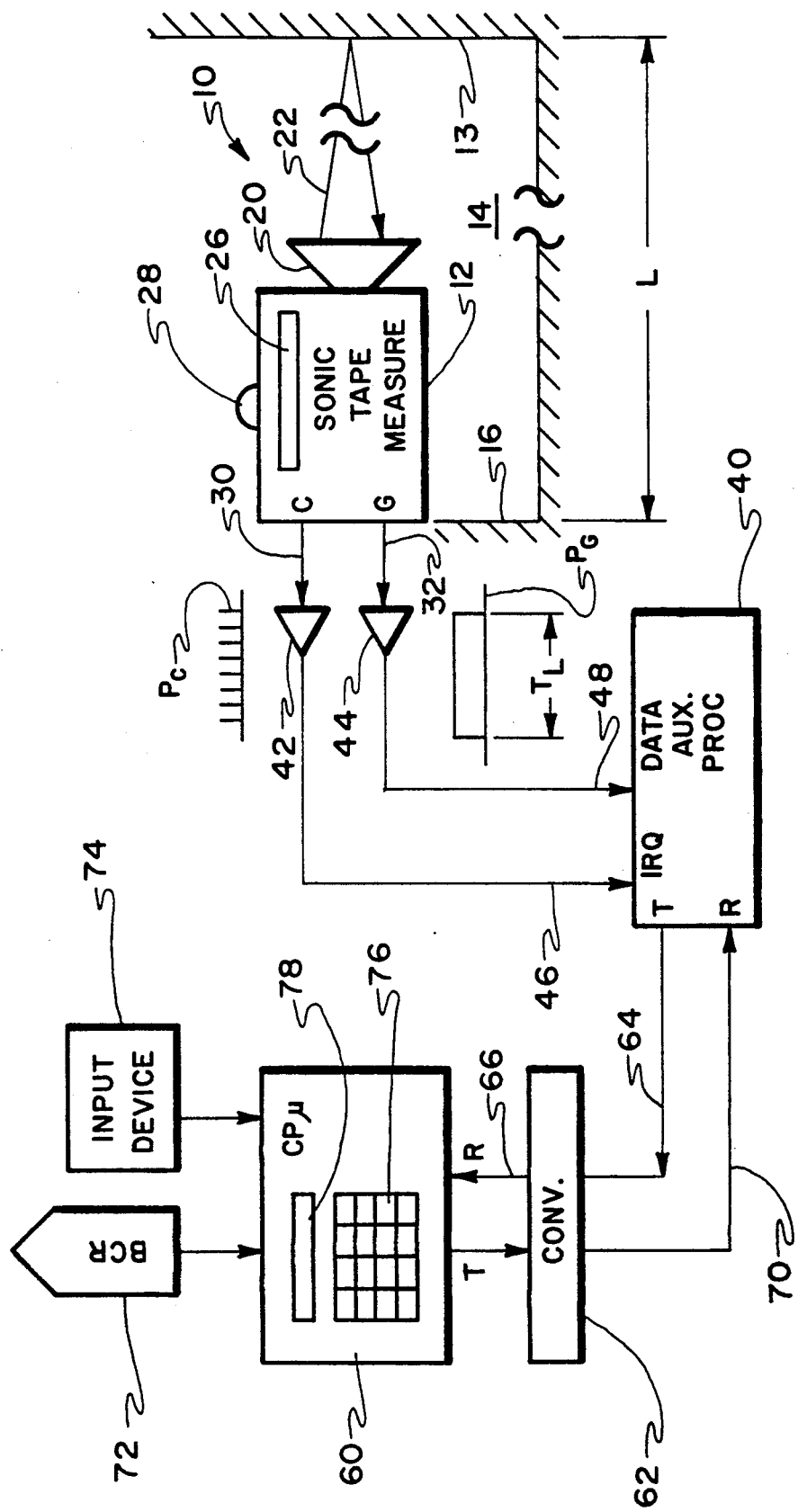
FIG. 1 is a schematic block diagram of a facility space data logging apparatus in accordance with the present invention.

FIG. 1 illustrates in schematic block form a circuit arrangement for a facility space data logging device or system 10 in accordance with the present invention. The system 10 includes an ultrasonic tape measuring device or sonic tape 12 for measuring dimensions of a room 14. In an exemplary arrangement, the sonic tape 12 is located in abutment with one wall 16 (reference wall 16) of the room 14. The sonic tape 12 has an ultrasonic transducer 20 which directs a pulse of ultrasonic radiation 22 at a wall 13 opposite reference wall 16. A reflected pulse 24 of ultrasonic radiation is received and detected by the transducer 20. The time of flight of the respective incident and reflected waves 22 and 24 provides a measure of distance between the walls 16 and 18 which is designated as L in FIG. 1. The sonic tape 12 is a well known device and has internal circuits, not shown, which produce an output in the form of a visual display 26 of a distance measurement in response to manual actuation of a start button 28 which applies power to the sonic tape 12. The measuring device 12 has an internal clock C and a gate G shown only as outputs on the drawing. The clock produces a series of count pulses $P_C$ and the gate G produces gate pulses $P_G$ each of which has a duration $T_L$ measured from the time that an initial pulse 22 is transmitted to the time that the reflected pulse 24 is received after actuation of the start button 28. The time $T_L$ corresponds to the length L. The measurements recur until the start button 28 is released. For purposes of the invention, three recurrences of the measurement are sensed and averaged. More precisely, the time $T_L$ divided by the speed of sound plus the length of the sonic tape housing equals L.

In accordance with the present invention, the outputs C and G which are coupled to clock and gate circuits, not shown, within the sonic tape 12, said outputs are also coupled to the respective output lines 30 and 32, such that, the clock pulses $P_C$ are imposed on output line 30 and the gate pulse $P_G$ is output on line 32. The clock pulses $P_C$ and gate pulses $P_G$ are coupled to an auxiliary microprocessor 40 via respective input lines 46 and 48 and a pair of corresponding buffers 42 and 44. The sonic tape 12 transmits and receives incident and reflected waves 22 and 24 on a periodic basis and consequently produces a series of gate pulses $P_G$ and a stream of clock pulses $P_C$. Information carried by the input line 46 namely the buffered clock pulses $P_C$ represents an interrupt request IRQ for the auxiliary microprocessor 40. Buffered gate pulse $P_G$ carried by input line 48 to the auxiliary microprocessor 40 represents data.

In accordance with the invention, upon the occurrence of an interrupt request IRQ on line 46, the auxiliary microprocessor 40 senses the incoming gate pulse $P_G$ and counts each IRQ pulse input during the gate pulse $P_G$ interval. It is only when the gate pulse $P_G$ is active as indicated that the auxiliary microprocessor 40 counts clock pulses, the number of which are interpreted as a length measurement. The auxiliary microprocessor 40 may be programmed to sense one or many gate pulses $P_G$. In a particular embodiment, the auxiliary microprocessor 40 senses at least three successive gate pulses $P_G$ in order to validate an input. The auxiliary microprocessor 40 converts the duration of the gate pulse $P_G$ in terms of count pulses $P_C$ which corresponds to $T_L$ by means of a suitable conversion factor e.g., each count pulse corresponds to 0.1 ft. Three such measurements are made and the average result is converted to a distance measure expressed in ASCII format. The ASCII code represents the length L measured by the sonic tape 12 and the ASCII data is transmitted to the cpu 60 as described below. In the embodiment herein described, the auxiliary microprocessor 40 is a Hitachi component employing a HD 63701 chip.

In accordance with the invention, a hand-held microprocessor 60 such as a Sharp model PC-1600 is adapted to receive information from the auxiliary microprocessor 40. However, in order for information to be communicated between the hand-held device 60 and the auxiliary microprocessor 40, a voltage level converter 62 is employed. The converter is a known TTL level to RS232 voltage level converter. The hand-held microprocessor 60 is adapted to receive information at RS232 level, whereas the auxiliary microprocessor 40 operates at C-MOS level or TTL levels. Converter 62 which is a Max 232 chip receives inputs from the auxiliary microprocessor 40 and converts them to RS232 levels for the hand-held CPU 60 and vice versa.

Information from the auxiliary microprocessor 40 is transmitted in ASCII to the R input of CPU 60 over TTL data line 64, converter 62 and RS232 line 66. If desired, data may be transmitted by the CPU 60 to auxillary processor 40. In such cases, CPU 60 may be provided with a RS 232 line 68 which is coupled to the auxiliary processor 40 via the converter 62 and line 70.

In accordance with the invention, the CPU 60 also includes a bar code reader 72. In addition or in lieu of the bar code reader 72, the CPU 60 may employ one or more input devices 74 such as an optical character reader or the like. The CPU 60 also has a key pad 76 which allows for manual response to prompts shown on a display 78.

Figure 2:
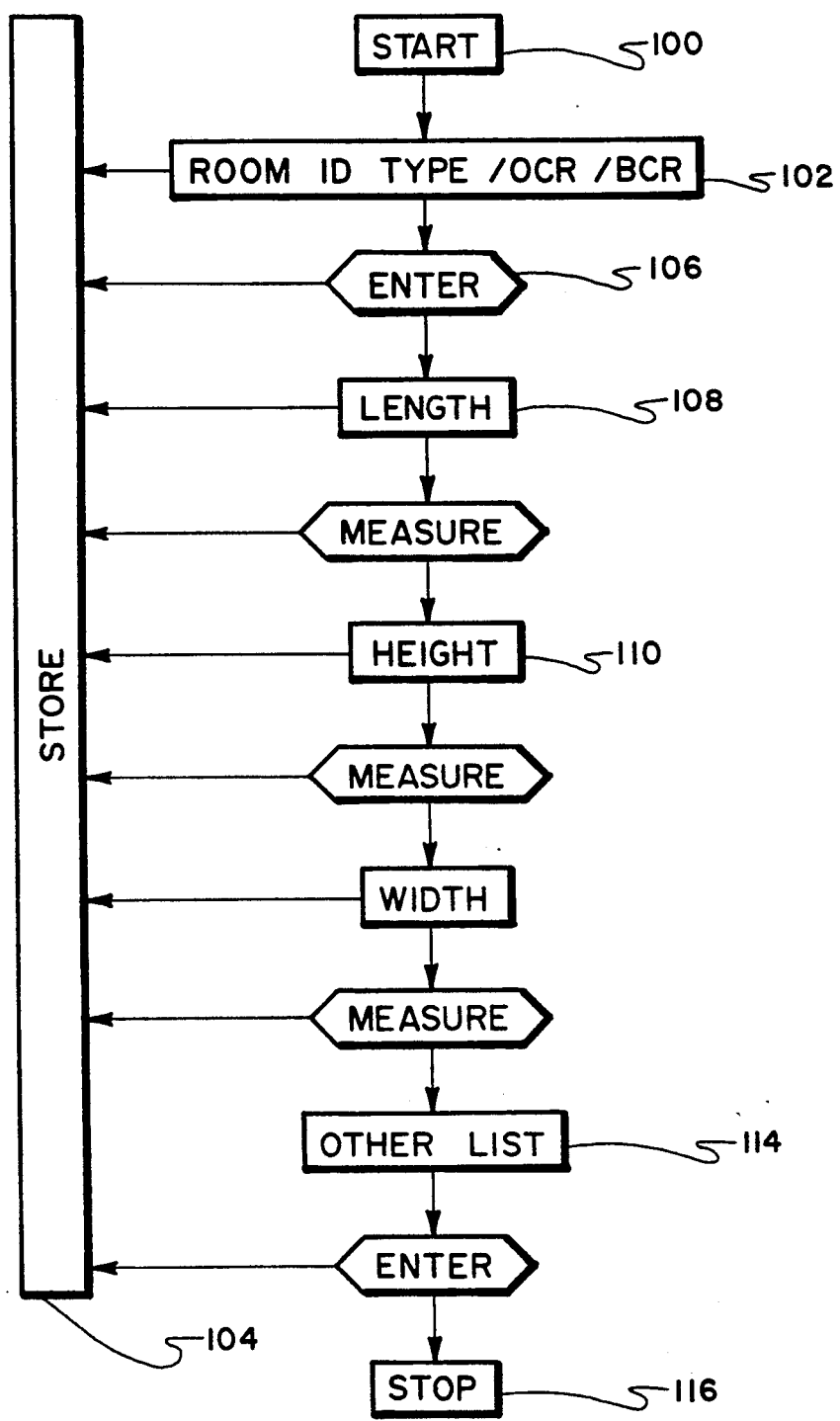
FIG. 2 is a simplified flow sheet for conducting a room measurement.

FIG. 2 illustrates, in simplified form, a flow chart for entering data in the CPU 60. In response to a start sequence at 100 prompt 102 may be brought up on display 78 requesting room identification. Entry of the room dimension data may be entered manually by means of the keypad 76 or by the sonic tape 12. The data may be entered at 106 for storage at 104 or it may be skipped. For example, skipping would occur if the room identification (ID) is or has been previously stored. After entry of the room ID, a length inquiry is displayed at 108. Measurement and entry of the length data may be accomplished in accordance with the invention by utilization of the sonic tape measuring device or it may be entered manually. When the measurement is made, the data is automatically stored or entered in storage 104. Thereafter, the sequence is continued in order via height prompt 110 and width prompt 112. Other data 114 may also be prompted and listed. After all data is entered or skipped as illustrated, the cycle ends at the stop command 116.

Figure 3:
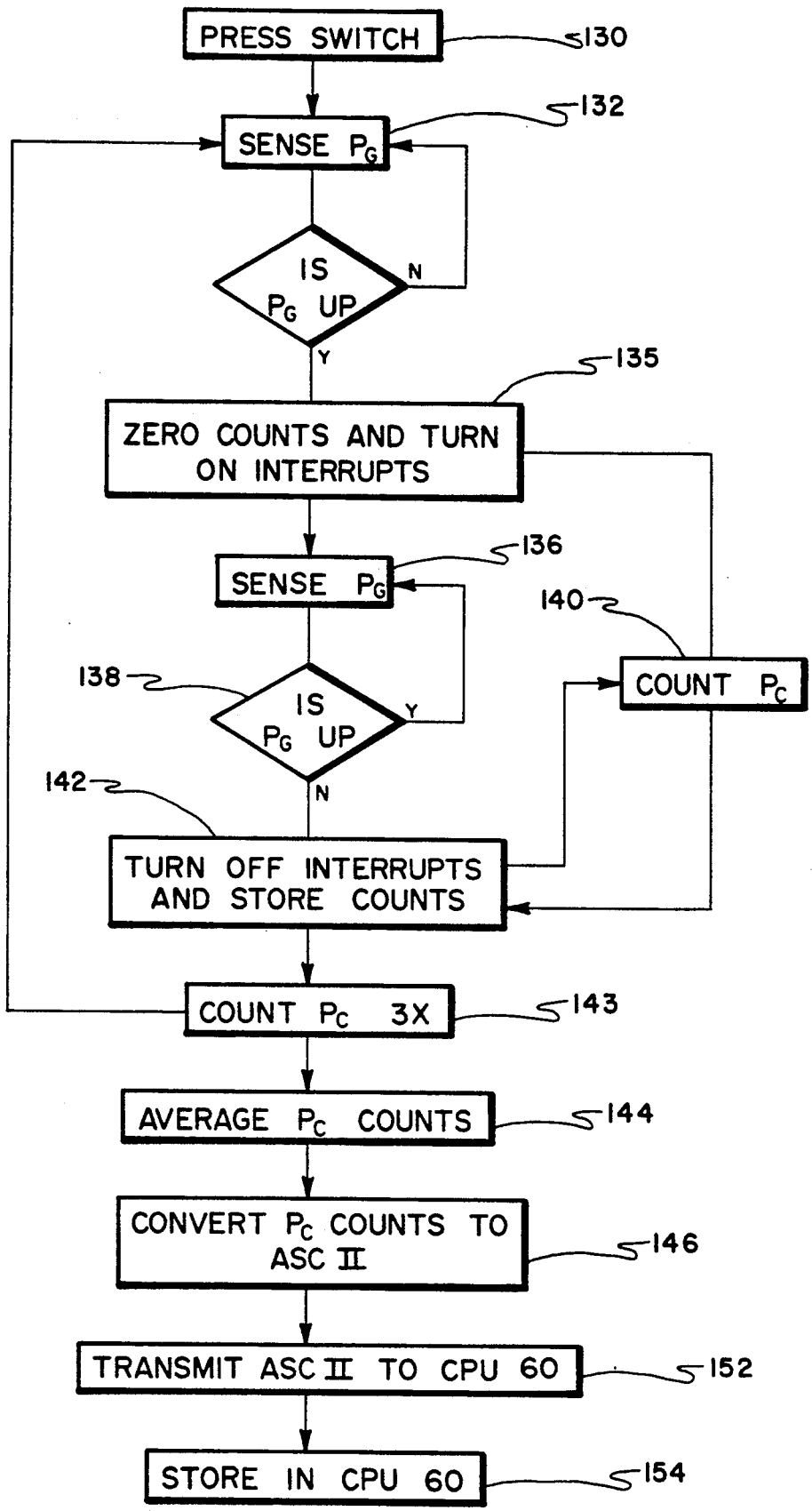
FIG. 3 is a simplified flow sheet or series of process steps for calculating a particular distance and automatically entering the data in a hand-held device.

FIG. 3 illustrates in simplified block form, a sequence for sensing and measuring the length L. In response to activation of the switch 28 at command block 130, the auxiliary microprocessor 40 senses data at 132. If the gate pulse $P_G$ is down or inactive as sensed at 134, the command is recycled.

If $P_G$ is up as sensed at block 134, a zero count and turn on interrupts sequence is initiated at block 135. Thereafter, $P_G$ is again sensed at 136. If $P_G$ is up as sensed at 138, the counts at 140 continue as the block recycles. When $P_G$ goes down, the count is stopped by turning off interrupts and storing counts block 1. In the embodiment illustrated, clock pulses $P_C$ may be counted for as long as the gate pulse $P_G$ is sensed on data line 48. In the event that the data line 48 goes down, as sensed and cycled at 138 counts are stopped at 142. In accordance with the embodiment illustrated, three gate cycles are sensed and cycled at 142 and are averaged at 144. The counts are then converted to an ASCII code representative of the distance L at 146. Data conversion of counts to L in ASCII may be means of a read only memory (ROM) or a look up table in auxiliary processor 40. The data may be coupled to the transmit line 64 whereupon the data is transmitted at 152 and stored in the CPU 60 at 154.

It can be readily understood that the various sequences may be readily programmed in a variety of computer languages by one skilled in the art. It should be further appreciated by those skilled in the art that the present invention is effective to fully automate the process for measuring, and recording data by a single individual employing the instrument herein described.

While there have been described what are considered to be the preferred embodiments of the present invention, it will be apparent to those skilled in the art that various changes may be made therein without departing from the invention and it is intended in the claims to cover such changes and modifications as fall within the true spirit and scope of the invention.

What is claimed is:

1. A portable data logging device for logging data concerning room identification and room dimensions of a facility comprising:
    a microprocessor based portable computer for logging the data, said computer having manual and automated input means for logging data including data for room dimensions;
    an electronic distance measuring device for producing an output indicative of a measured room dimension in digital format and an auxiliary processor responsively coupled to the output of the distance measuring device for converting the output to a coded format compatible to said microprocessor, said auxiliary processor coupled to a data port of the microprocessor.

2. The data logging device of claim 1, further comprising converter means for carrying signals between the microprocessor and the auxiliary processor.

3. The data logging device of claim 2, wherein the auxiliary processor and microprocessor operate at different voltage levels and the converter produces inputs and outputs for communication between the microprocessor and the auxiliary processor in selected voltage ranges respectively compatible therewith.

4. The data logging device of claim 1, where the electronic distance measuring device comprises a sonic tape for producing an ultrasonic pulse and for receiving reflected pulses, and having gate and clock outputs, the gate output corresponding to the time between a transmitting and receiving pulse and the clock output corresponding to counts during said time corresponding to a distance measure.

5. The data logging device of claim 4, wherein the auxiliary processor means is responsive to gate and clock outputs for producing a coded output in ASCII corresponding to the distance measure.

6. The data logging device of claim 4, wherein a buffer couples each of the gate and clock outputs of the sonic tape to the auxiliary processor.

7. The data logging device of claim 1, further including means for storing the data in said microprocessor.

* * * * *